(12) United States Patent
Schindlauer et al.

(10) Patent No.: US 9,348,868 B2
(45) Date of Patent: *May 24, 2016

(54) EVENT PROCESSING WITH XML QUERY BASED ON REUSABLE XML QUERY TEMPLATE

(71) Applicant: Microsoft Technology Licensing, LLC, Redmond, WA (US)

(72) Inventors: Roman Schindlauer, Seattle, WA (US); Beysim Sezgin, Redmond, WA (US); Torsten Grabs, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/602,742

(22) Filed: Jan. 22, 2015

(65) Prior Publication Data

US 2015/0134698 A1    May 14, 2015

Related U.S. Application Data (63) Continuation of application No. 12/603,308, filed on Oct. 21, 2009, now Pat. No. 9,158,816.

(51) Int. Cl.
*G06F 17/30* (2006.01)

(52) U.S. Cl.
CPC .... *G06F 17/30477* (2013.01); *G06F 17/30929* (2013.01)

(58) Field of Classification Search
CPC ............... G06F 8/20; G06F 17/30477; G06F 17/30929; G06Q 10/063; G06Q 10/103
USPC .................... 707/769, 760, 763, 779
See application file for complete search history.

(56) References Cited

U.S. PATENT DOCUMENTS

| 5,321,837 A | 6/1994 | Daniel et al. |
| 5,528,516 A | 6/1996 | Yemini et al. |
| 5,546,570 A | 8/1996 | McPherson et al. |

(Continued)

FOREIGN PATENT DOCUMENTS

| JP | 11-259578 | 9/1999 |
| JP | 2003-308333 | 10/2003 |

(Continued)

OTHER PUBLICATIONS

U.S. Appl. No. 13/438,836, Non-Final Office Action mailed May 11, 2015, 11 pages.

(Continued)

*Primary Examiner* — Thanh-Ha Dang
(74) *Attorney, Agent, or Firm* — Kate Drakos; Danielle Johnston Holmes; Micky Minhas (57) ABSTRACT

Methods, systems, and computer-readable media are disclosed for event processing with a query based on a reusable XML query template. A particular method includes receiving a plurality of events from a source and generating a plurality of event objects based on the plurality of events. A query represented by an XML file based on a reusable XML query template is executed with respect to the plurality of event objects to produce a plurality of result objects. Each result object is produced based on an application of at least one operator of the query. A plurality of results is generated based on the plurality of result objects, and the plurality of results is transmitted to a sink.

20 Claims, 6 Drawing Sheets

(56) References Cited

U.S. PATENT DOCUMENTS

| | | |
|---|---|---|
| 5,691,917 A | 11/1997 | Harrison |
| 5,765,037 A | 6/1998 | Morrison et al. |
| 5,805,782 A | 9/1998 | Foran |
| 5,809,235 A | 9/1998 | Sharma et al. |
| 5,891,046 A | 4/1999 | Cyrus |
| 5,999,908 A | 12/1999 | Abelow |
| 6,145,009 A | 11/2000 | Miyazawa et al. |
| 6,236,998 B1 | 5/2001 | Lehtinen |
| 6,253,313 B1 | 6/2001 | Morrison et al. |
| 6,327,587 B1 | 12/2001 | Forster |
| 6,336,139 B1 | 1/2002 | Feridun et al. |
| 6,449,618 B1 | 9/2002 | Blott et al. |
| 6,477,562 B2 | 11/2002 | Nemirovsky et al. |
| 6,484,203 B1 | 11/2002 | Porras |
| 6,496,831 B1 | 12/2002 | Baulier |
| 6,507,840 B1 | 1/2003 | Ioannidis |
| 6,601,058 B2 | 7/2003 | Forster et al. |
| 6,604,102 B2 | 8/2003 | Klein et al. |
| 6,629,106 B1 | 9/2003 | Narayanaswarny et al. |
| 6,633,910 B1 | 10/2003 | Rajan |
| 6,681,230 B1 | 1/2004 | Blott et al. |
| 6,763,353 B2 | 7/2004 | Li |
| 6,775,658 B1 | 8/2004 | Zothner |
| 6,782,379 B2 | 8/2004 | Lee |
| 6,920,468 B1 | 7/2005 | Cousins et al. |
| 6,925,631 B2 | 8/2005 | Golden |
| 6,941,557 B1 | 9/2005 | Jakobson |
| 6,954,757 B2 | 10/2005 | Zargham |
| 7,013,289 B2 | 3/2006 | Horn |
| 7,020,618 B1 | 3/2006 | Ward |
| 7,028,324 B2 | 4/2006 | Shimizu |
| 7,065,561 B2 | 6/2006 | Fry et al. |
| 7,065,566 B2 | 6/2006 | Menard |
| 7,103,556 B2 | 9/2006 | Del Rey |
| 7,107,224 B1 | 9/2006 | Weller |
| 7,310,638 B1 | 12/2007 | Blair |
| 7,349,675 B2 | 3/2008 | Karr et al. |
| 7,349,925 B2 | 3/2008 | Cherkauer et al. |
| 7,383,255 B2 | 6/2008 | Desai |
| 7,409,428 B1 | 8/2008 | Barbec et al. |
| 7,457,728 B2 | 11/2008 | Chen et al. |
| 7,467,018 B1 | 12/2008 | Callaghan |
| 7,523,190 B1 | 4/2009 | Bickerstaff et al. |
| 7,525,646 B1 | 4/2009 | Sullivan et al. |
| 7,590,644 B2 | 9/2009 | Matsakis |
| 7,657,540 B1 | 2/2010 | Bayliss |
| 7,676,461 B2 | 3/2010 | Chkdrov |
| 7,702,689 B2 | 4/2010 | Forstmann et al. |
| 7,840,592 B2 | 11/2010 | Muras |
| 7,890,923 B2 | 2/2011 | Elaasar |
| 7,996,388 B2 | 8/2011 | Jain |
| 8,019,390 B2 | 9/2011 | Sindhu |
| 8,060,614 B2 | 11/2011 | Goldstein et al. |
| 8,132,184 B2 | 3/2012 | Gerea et al. |
| 8,224,805 B2 | 7/2012 | Lee |
| 8,291,005 B2 | 10/2012 | Lang et al. |
| 8,296,331 B2 | 10/2012 | Chkodrov et al. |
| 8,296,434 B1 | 10/2012 | Miller |
| 8,315,990 B2 | 11/2012 | Barga et al. |
| 8,447,859 B2 | 5/2013 | Bobak |
| 8,775,482 B2 | 7/2014 | Chkodrov et al. |
| 9,035,880 B2 | 5/2015 | Elyada et al. |
| 9,158,816 B2 | 10/2015 | Schindlauer et al. |
| 9,229,986 B2 | 1/2016 | Goldstein et al. |
| 2002/0016771 A1 | 2/2002 | Carothers |
| 2002/0032676 A1 | 3/2002 | Reiner et al. |
| 2002/0059183 A1 | 5/2002 | Chen |
| 2002/0062237 A1 | 5/2002 | Matsumoto |
| 2002/0083049 A1 | 6/2002 | Forster et al. |
| 2002/0099578 A1 | 7/2002 | Eicher, Jr. |
| 2002/0129024 A1 | 9/2002 | Lee |
| 2002/0147711 A1* | 10/2002 | Hattori ............. G06F 17/30938 |
| 2003/0120450 A1 | 6/2003 | Ernst |
| 2003/0163465 A1 | 8/2003 | Morrill |
| 2003/0181991 A1 | 9/2003 | Chau |
| 2003/0236677 A1 | 12/2003 | Casati |
| 2004/0068428 A1 | 4/2004 | Mitchell |
| 2004/0098390 A1 | 5/2004 | Bayliss et al. |
| 2004/0111396 A1 | 6/2004 | Musayev et al. |
| 2004/0137954 A1 | 7/2004 | Engstrom et al. |
| 2004/0153329 A1 | 8/2004 | Casati |
| 2004/0158429 A1 | 8/2004 | Bary |
| 2004/0172409 A1 | 9/2004 | James |
| 2004/0172599 A1 | 9/2004 | Calahan |
| 2004/0177053 A1 | 9/2004 | Donoho |
| 2004/0205082 A1 | 10/2004 | Fontoura et al. |
| 2004/0205110 A1 | 10/2004 | Hinshaw |
| 2004/0220791 A1 | 11/2004 | Lamkin |
| 2004/0260829 A1 | 12/2004 | Husak et al. |
| 2005/0052427 A1 | 3/2005 | Wu et al. |
| 2005/0055631 A1 | 3/2005 | Scardina et al. |
| 2005/0138081 A1 | 6/2005 | Alshab et al. |
| 2005/0165724 A1 | 7/2005 | West |
| 2005/0182758 A1* | 8/2005 | Seitz ..................... G06F 9/5016 |
| 2006/0017692 A1 | 1/2006 | Wehrenberg et al. |
| 2006/0033625 A1 | 2/2006 | Johnson et al. |
| 2006/0059268 A1 | 3/2006 | Victor et al. |
| 2006/0069942 A1 | 3/2006 | Brasilerio et al. |
| 2006/0074741 A1 | 4/2006 | Orumchian et al. |
| 2006/0100969 A1 | 5/2006 | Wang et al. |
| 2006/0123119 A1 | 6/2006 | Hill et al. |
| 2006/0130070 A1 | 6/2006 | Graf |
| 2006/0136448 A1 | 6/2006 | Cialini et al. |
| 2006/0149849 A1 | 7/2006 | Raz |
| 2006/0161523 A1 | 7/2006 | Dettinger |
| 2006/0161528 A1 | 7/2006 | Dettinger et al. |
| 2006/0230071 A1 | 10/2006 | Kass et al. |
| 2006/0248182 A1 | 11/2006 | Glassco et al. |
| 2006/0253831 A1 | 11/2006 | Harper |
| 2006/0265406 A1 | 11/2006 | Chkodrov |
| 2006/0277253 A1 | 12/2006 | Ford |
| 2006/0282695 A1 | 12/2006 | Mital et al. |
| 2007/0043856 A1 | 2/2007 | Morris et al. |
| 2007/0118545 A1 | 5/2007 | Chandrasekharan et al. |
| 2007/0136239 A1 | 6/2007 | Lee et al. |
| 2007/0168990 A1 | 7/2007 | Alshab et al. |
| 2007/0237410 A1 | 10/2007 | Cormode et al. |
| 2007/0255529 A1 | 11/2007 | Biazetti et al. |
| 2007/0276815 A1 | 11/2007 | Naibo et al. |
| 2007/0294217 A1 | 12/2007 | Chen et al. |
| 2008/0016095 A1 | 1/2008 | Bhatnagar et al. |
| 2008/0021666 A1 | 1/2008 | Goode et al. |
| 2008/0065590 A1* | 3/2008 | Castro ............... G06F 17/30463 |
| 2008/0065666 A1 | 3/2008 | Rose et al. |
| 2008/0114803 A1 | 5/2008 | Chinchwadkar |
| 2008/0120283 A1 | 5/2008 | Liu |
| 2008/0129491 A1 | 6/2008 | Ruperto |
| 2008/0133891 A1 | 6/2008 | Salz et al. |
| 2008/0134135 A1 | 6/2008 | Elaasar |
| 2008/0134158 A1 | 6/2008 | Salz et al. |
| 2008/0214902 A1 | 9/2008 | Lee |
| 2008/0215428 A1 | 9/2008 | Ramer |
| 2008/0256384 A1 | 10/2008 | Branson et al. |
| 2008/0284738 A1 | 11/2008 | Hovden |
| 2008/0301124 A1 | 12/2008 | Alves et al. |
| 2008/0301135 A1 | 12/2008 | Alves et al. |
| 2008/0301175 A1 | 12/2008 | Applebaum |
| 2009/0012867 A1 | 1/2009 | Lerman et al. |
| 2009/0037370 A1 | 2/2009 | Mishra |
| 2009/0052341 A1 | 2/2009 | Enqvist |
| 2009/0070765 A1 | 3/2009 | Alves et al. |
| 2009/0070786 A1* | 3/2009 | Alves ..................... G06F 9/541 |
| | | 719/318 |
| 2009/0100029 A1 | 4/2009 | Jain et al. |
| 2009/0106190 A1 | 4/2009 | Srinivasan et al. |
| 2009/0106218 A1 | 4/2009 | Srinivasan et al. |
| 2009/0125550 A1 | 5/2009 | Barga et al. |
| 2009/0125635 A1 | 5/2009 | Barga et al. |
| 2009/0150367 A1 | 6/2009 | Melnik et al. |
| 2009/0178059 A1 | 7/2009 | Lang et al. |
| 2009/0204551 A1 | 8/2009 | Wang et al. |
| 2009/0219166 A1 | 9/2009 | MacFarlane |
| 2009/0222793 A1 | 9/2009 | Frank et al. |
| 2009/0228465 A1 | 9/2009 | Krishnamurthy et al. |

(56) References Cited

U.S. PATENT DOCUMENTS

| | | |
|---|---|---|
| 2009/0265336 A1 | 10/2009 | Suntinger et al. |
| 2009/0278828 A1 | 11/2009 | Fletcher et al. |
| 2009/0319501 A1 | 12/2009 | Goldstein et al. |
| 2009/0319687 A1 | 12/2009 | Goldstein et al. |
| 2010/0017214 A1 | 1/2010 | Ambrosio et al. |
| 2010/0017379 A1 | 1/2010 | Naibo et al. |
| 2010/0041391 A1 | 2/2010 | Spivey et al. |
| 2010/0088325 A1 | 4/2010 | Goldstein et al. |
| 2010/0121744 A1 | 5/2010 | Belz et al. |
| 2010/0123737 A1 | 5/2010 | Williamson et al. |
| 2010/0125545 A1 | 5/2010 | Navas |
| 2010/0131538 A1 | 5/2010 | Jones et al. |
| 2010/0138285 A1 | 6/2010 | Leonard |
| 2010/0141571 A1 | 6/2010 | Chiang |
| 2010/0141658 A1 | 6/2010 | Danton et al. |
| 2010/0280857 A1 | 11/2010 | Liu et al. |
| 2010/0331146 A1 | 12/2010 | Kil |
| 2011/0016123 A1 | 1/2011 | Pandey et al. |
| 2011/0029393 A1 | 2/2011 | Apprendi |
| 2011/0032268 A1 | 2/2011 | Takei |
| 2011/0040808 A1 | 2/2011 | Joy et al. |
| 2011/0059775 A1 | 3/2011 | Choi et al. |
| 2011/0093162 A1 | 4/2011 | Nielsen et al. |
| 2011/0093306 A1* | 4/2011 | Nielsen ............... G06Q 10/0631 705/7.13 |
| 2011/0093490 A1 | 4/2011 | Schindlauer et al. |
| 2011/0093631 A1* | 4/2011 | Gerea ...................... G06F 9/542 710/104 |
| 2011/0093723 A1 | 4/2011 | Brown et al. |
| 2011/0093866 A1 | 4/2011 | Grabs et al. |
| 2011/0169823 A1 | 7/2011 | Barenburg |
| 2011/0176720 A1 | 7/2011 | Van Osten |
| 2011/0213664 A1 | 9/2011 | Osterhout |
| 2011/0261048 A1 | 10/2011 | Lee |
| 2011/0283144 A1* | 11/2011 | Nano ................... G06F 11/323 714/37 |
| 2012/0036485 A1 | 2/2012 | Watkins |
| 2012/0041825 A1 | 2/2012 | Kasargod |
| 2012/0084322 A1 | 4/2012 | Goldstein et al. |
| 2012/0268391 A1 | 10/2012 | Somers |
| 2013/0014094 A1 | 1/2013 | Chkodrov et al. |
| 2013/0031567 A1 | 1/2013 | Nano et al. |
| 2013/0201303 A1 | 8/2013 | Shimotani |
| 2013/0229406 A1 | 9/2013 | Elyada et al. |
| 2013/0262645 A1 | 10/2013 | Akchurin et al. |
| 2015/0134698 A1 | 5/2015 | Schindlauer et al. |

FOREIGN PATENT DOCUMENTS

| | | |
|---|---|---|
| JP | 2004-240766 | 8/2004 |
| WO | 9215066 | 9/1992 |
| WO | 2007035452 | 3/2007 |

OTHER PUBLICATIONS

Abadi, "Aurora: A New Model and Architecture for Data Stream Management", In The VLDB Journal, Aug. 2003.
Abadi, "The Design of the Borealis Stream Processing Engine", In Proceedings of the 2nd Conference on Innovative Data Systems Research, Jan. 4-7, 2005.
Ali, "Microsoft CEP Sever and Online Behavioral Targeting," In Proceedings of the ACM International Conference on Very Large Data Bases, Aug. 24-28, 2009.
Arasu, "CQL: A Language for Continuous Queries over Streams and Relations", 9th International! Workshop on Database Programming Languages, Sep. 6-8, 2003.
Arasu, "STREAM: The Stanford Stream Data Manager", In Proceedings of the ACM SIGMOD International Conference on Management of Data, Jun. 9-12, 2003.
Arasu, "The CQL Continuous Query Language: Semantic Foundations and Query Execution", In The VLDB Journal, Jun. 2006.
Arasu, et al. "STREAM: The Standford Data Stream Management System," book chapter, Stanford University, 21 pages, USA.
Babcock, et al.; "Models and Issues in Data Stream Systems"; Proceedings of the 21$^{st}$ ACM SIGMOD-SIGACT-SIGART Symposium on Principles of Database Systems (PODS *02); 2002; pp. 1-30.
Babu, "A Data Stream Management System for Network Traffic Management", In Proceedings of the Workshop on Network-Related Data Management, May 25, 2001.
Babu, et al. "StreaMon: An Adaptive Engine for Stream Query Processing"; ACM International Conference on Management of Data (SIGMOD 2004); 2004; pp. 931-932.
*BAM API (BizTalk Server Sample)*, Microsoft, Published on or Before 2007.
Barga et al, "Consistent Streaming Through Time: A Vision for Event Stream Processing", retrieved at <<http://www.cs.Cornell.edu/~mshong/papers/cidr%2007%20cedr.pdf>>, Jan. 7-10, 2007. pp. 12.
Barga, "CEDR—Complex Event Detection and Response; Research Brief (CEDR)", Microsoft TechFest, Mar. 1-2, 2006.
Barga, "Event Correlation and Pattern Detection in CEDR", In Proceedings of the Extending Database Technology Workshops, Reactivity on the Web, Mar. 26-31, 2006.
Barga, et al.; "Coping with Variable Latency and Disorder in Distributed Event Streams"; 26$^{th}$ IEEE International Conference on Distributed Computing Systems Workshops *ICDCSW'06); 2006; pp. 6.
Barish et al.; "Speculative Execution for Information Gathering Plans"; 2002; pp. 184-193.
Barish et al.; "Speculative Plan Execution for Information Gathering"; 2008; pp. 1-50.
Baulier, "A Database System for Real-Time Event Aggregation in Telecommunication", In Proceedings of the 24th Conference on Very Large Data Bases, Aug. 24-27, 1998.
Berenson, "Microsoft SQL Server Query Processor Internals and Architecture", Microsoft, Jan. 2000.
Bernhardt, et al. *"Complex Event Processing Made Simple Using Esper"*, Retrieved at <<http://www.theserverside.com/tt/articles/article.tss?l=ComplexEventProcessing>>, Apr. 2008. pp. 5.
*BizTalk Server 2004: BizTalk Server Business Rules Framework*, Microsoft White Paper, Dec. 2003.
*BizTalk Server 2006 R2*, Microsoft, 2006.
Bonnet, "Towards Sensor Database Systems", In Proceedings of the 2nd International Conference on Mobile Data Management, Jan. 8-10, 2001.
Bry et al, "A High-Level Query Language for Events", retrieved at <<http://www.pms.ifi.lmu.de/mitarbeiter/eckert/publications/EDA-PS2006.pdf>>, 2006. pp. 8.
*C# Version 3.0 Specification*, Microsoft, May 2006.
Carlson, "An Event Detection Algebra for Reactive Systems", In Proceedings of the 4th ACM International Conference on Embedded Software, Sep. 27-29, 2004.
Chakravarthy, "Composite Events for Active Databases: Semantics, Contexts and Detection", In Proceedings of the 20th International Conference on Very Large Data Bases, Sep. 12-15, 1994.
Chandrasekaran, "TelegraphCQ: Continuous Dataflow Processing for and Uncertain World", In Proceedings of the 1st Conference on Innovative Data Systems Research, Jan. 5-8, 2003.
Chen, et al. "NiagaraCQ: A Scalable Continuous Query System for Internet Databases"; Proceedings of the 2000 ACM SIGMOD International Conference on Management of Data; 2000; pp. 379-390.
Cherniack, et al.; "Scalable Distributed Stream Processing"; Proceedings of the 2003 CIDR Conference; 2003; pp. 1-12.
*Complex Event Processing (CEP)*, retrieved at <<http://www.progress.com/psm/apama/data-streams/index.ssp>>, Mar. 9, 2007. pp. 2.
*Complex Event Processing Made Simple Using Esper*; The Server Side.com; Apr. 2008; 6 pages.
*Complex Event Processing Tutorial*; retrieved from http://www.eventstreamprocessina.com/CEP-tutorial.htm; Jun. 2007; 2 pages.
Cranor, "Gigascope: A Stream Database for Network Applications", In Proceedings of the ACM SIGMOD International Conference on Management of Data, Jun. 9-12, 2003 . . . .
Dean, "MapReduce: Simplified Data Processing on Large Clusters", In Proceedings of the 6th Symposium on Operating Systems Design and Implementation, Dec. 6-8, 2004.

(56) References Cited

OTHER PUBLICATIONS

Demers, "Cayuga: A General Purpose Event Monitoring System", Third Biennial Conference on Innovative Data Systems Research, Jan. 7-10, 2007.
Demers, "Towards Expressive Publish/Subscribe Systems", In Proceedings of the 10th International Conference on Extending Database Technology, Mar. 26-31, 2006.
Elyada, et al., "Controlling Images at Mobile Devices Using Sensors," New US Patent Application filed Today.
*Event Stream Intelligence with Esper and NEsper*; retrieved from http://esper.codehaus.ora: retrieved Mar. 7, 2011; 4 pages.
*Event-Driven Models and Complex Event Processing*, retrieved at <<http://www.cxo.eu.com/article/Event-driven- models-and-complex-event-processing/>>, 2009. pp. 3.
Franklin, "Design Considerations for High Fan-In Systems: The HiFi Approach", In Proceedings of the 2nd Conference on Innovative Data Systems Research, Jan. 4-7, 2005.
Ghanem, "Exploiting Predicate-Window Semantics Over Data Streams", In Proceedings of the ACM SIGMOD International Conference on Management of Data, Jun. 27-29, 2006.
Ghanem, "Incremental Evaluation of Sliding-Window Queries Over Data Streams", In Proceedings of the IEEE Transactions on Knowledge and Data Engineering, Jan. 2007.
Goldstein, "Operator Algorithm Design for Speculative Stream Processing", Microsoft Research Technical Report MSR-TR-2007-158, Dec. 2007. (Previously titled as "Consistency Sensitive Operators in CEDR".).
Goldstein, J. et al.; "Flying Fixed-Point: Recursive Processing in Stream Queries"; VLDB '08; Aug. 24-30, 2008; Auckland, New Zealand.
Grabs et al, "Introducing Microsoft StreamInsight", Sep. 2009. pp. 27.
Grabs et al, "Introducing Microsoft's Platform for Complex Event Processing", May 2009. pp. 24.
Gyllstrom, "On Supporting Kleene Closure over Event Streams", Proceedings of the 24th International Conference on Data Engineering, Apr. 7-12, 2008.
Gyllstrom, D. et al.; "SASE: Complex Event Processing over Streams"; 3'$^a$ Biennial Conference on Innovative Data Systems Research (CIDR); Jan. 2007; pp. 407-411.
Hammad, "Nile: A Query Processing Engine for Data Streams", Proceedings of the 20th International Conference on Data Engineering, Mar. 30-Apr. 2, 2001.
*Integration Services Architecture*, Microsoft, Published on or Before Jul. 17, 2006.
*Interactive Advertising Bureau Mobile Rich-media Ad Interface Definitions (MRAID)* v 1.0, Published on: Oct. 20, 2011, Available at: http://www.iab.net/media/file/IAB_MRAID_VersionOne_final.pdf.
Isard, "Dryad: Distributed Data-Parallel Programs from Sequential Building Blocks", In Proceedings of EuroSys, Mar. 21-23, 2007.
JadeDragon, "iPad Game Review: CF Defense HD," Retrieved at: http://www.mobiletechreview.com/ubbthreads/showflat.php?Cat=0&Number=37978&an=0&page=13, Jul. 26, 2010.
Jensen, "Temporal Specialization", In Proceedings of the 8th International Conference on Data Engineering, Feb. 3-7, 1992.
Jiang et al, "Anatomy of a Data Stream Management System", retrieved at <<http://ftp.informatik.rwth-aachen.de/ Publications/CEUR-WS/Vol-215/paper12.pdf>>, 2004. pp. 16.
Jiang, et al, "Estreams: Towards an Integrated Model for Event and Stream Processing", retrieved at <<http:// ariana.uta.edu/research/Publications/Downloads/CSE-2004-3.pdf>>, Jul. 1, 2004. pp. 25.
Johnson et al, "A Heartbeat Mechanism and its Application in Gigascope", retrieved at <<http://www.vldb.org/ conf/2005/papers/p1079-johnson.pdf>>, 2005. pp. 10.
LePage, P. "This End Up: Using Device Orientation," Retrieved at: http://www.html5rocks.com/en/tutorials/device/orientation/, Apr. 29, 2011.
Li, "Semantics and Evaluation Techniques for Window Aggregates in Data Streams", in Proceedings of the ACM SIGMOD International Conference on Management of Data, Jun. 14-16, 2005.
Li, "Study on Smoothing Browser in Multi-View Virtual Space Based on Panorama", In Proceedings of the International Archives of the Photogrammetry, Remote Sensing and Spatial Information Sciences, Jul. 3-11, 2008.
Loddengaard, A.; "FoneDoktor, A WibiData Application"; retrieved from http://www.clouders.com/blog/2011/12/fonedoktor-a-wibidata-application; Dec. 6, 2011; 5 pages.
Madden, "Continuously Adaptive Continuous Queries Over Streams", In Proceedings of the ACM SIGMOD International Conference on Management of Data, Jun. 4-6, 2002.
Maier, "Semantics of Data Streams and Operators", Proceedings of the 10th International Conference on Database Theory, . . . Jan. 5-7, 2005.
*Microsoft StreamInsight*, retrieved at <<http://msdn.microsoft.com/en-us/library/ee362541(SQL.105,printer).aspx, pp. 1. Retrieved Date: Mar. 7, 2011.
Milner, "BizTalk Server 2004: A Messaging Engine Overview", May 2005.
Nasiri, et al. "Motion Processing: The Next Breakthrough Function in Handsets," In Proceedings of InvenSense Inc., Jul. 2009, 10 pages.
Naughton, "The Niagara Internet Query System", IEEE Database Engineering Bulletin, Jun. 2001.
Nichols, "Smoothing Sensor Data with a Low-Pass Filter," Apr. 24, 2011.
Oberoi, et al.; "Integrating DDS and COTS Complex-Event Processing Engines"; Proceedings of Object Management Group Workshop; Jul. 2007; 42 pages.
*Oracle CEP 11gR1—official support for CQL*, retrieved at <<http://adcalves.wordpress.com/2009/07/01/oracle- cep-11gr1-official-support-for-cql/>>, Jul. 1, 2009. pp. 3.
Pallickara; "A Grid Event Service"; Graduate School of Syracuse University; Jun. 2001; pp. 110.
PCT International Search Report and Written Opinion for Application No. PCT/US2008/070359, Jan. 19, 2009.
Preiss et al.; "On the Trade-off between Tim and Space in Optimistic Parallel Discrete-Event Simulation"; 1992; pp. 1-10.
Raizman, et al.; "An Extensible Test Framework for the Microsoft StreamInsight Query Processor"; Proceedings of the Third International Workshop on Testing Database Systems; Jun. 7, 2010; 6 pages.
Ramskrishnan, "Efficient Bottom-Lip Evaluation of Logic Programs", Computer Systems and Software Engineering, Kluwer Academic Publishers, 1992.
Ravindran et al, "A Resource Management Model for Dynamic, Scalable, Dependable, Real-Time Systems", retrieved at <<http://citeseerx.ist.psu.edu/viewdoc/download?doi=10.1.1.40.5779&rep=rep1&type=ps>>, Apr. 11, 2006. pp. 6.
Smith, M.; "Support for Speculative Execution in High-Performance Processors"; 1992; pp. 7-89.
Snoeren et al, "Mesh-Based Content Routing using XML", retrieved at <<http://xml.coverpages.org/SnoerenMESH- XML.pdf>>, 18in ACM Symposium on Operating System Principles; 2001; pp. 160-173.
Sooksanan, "Validation Rules for Exporting Business Process Diagram to Business Process Execution Language", In Proceedings of the 4th International Conference on eBusiness, Nov. 19-20, 2005.
*SQL Server 2008 R2—Streaminsight Technology*, retrieved at <<http://www.microsoft.com/sqlserver/2008/en/us/R2- complex-event.aspx>>, pp. 2.
Srinivasan, "Airborne Traffic Surveillance Systems: Video Surveillance of Highway Traffic", In Proceedings of the 2nd ACM International Workshop on Video Surveillance and Sensor Networks, Oct. 15, 2004.
Srivastava, et al.; "Flexible Time Management in Data Stream Systems"; Proceedings of the Twenty-Third ACM SIGMOD-SIGACT-SIGART Symposium on Principles of Database Systems; Jun. 14-16, 2004; Paris, France; pp. 263274.
Srivastava, et al.; "Operator Placement for In-Network Stream Query Processing"; Technical Report; 2004; pp. 10.
*StreamBase Server*, Published on or Before May 7, 2007, 3 pages, StreamBase Systems, Inc., USA.

(56) References Cited

OTHER PUBLICATIONS

*StreamBase Studio*, Published on or Before May 7, 2007, 5 pages, StreamBase Systems, Inc. USA.
*StreamInsight SQL Server 2008 R2*; retrieved from httD://www.rnicrosoft.com/salserver/2008/en/us/R2-comDlex-event.asDx; 2009; 2 pages.
*StreamSQL*, Published on or Before Nov. 13, 2006, 2 pages, StreamBase Systems, Inc., USA.
*System Center Operations Manager 2007 End to End Service Management Without the Day to Day Drama*, Microsoft, 2006.
Tucker et al., "Exploiting Punctuation Semantics in Continuous Data Streams", IEEE Transactions on Knowledge & Data Engineering, vol. 15, No. 3, May/Jun. 2003.
*Uncover Your World with AdMob Rich Media and the Google Search App*, Published on: Aug. 26, 2011, Available at: http://googlemobileads.blogspot.com/2001/08/uncover-you-world-with-admob-rich.html.
U.S. Appl. No. 11/779,574, Notice of Allowance mailed Oct. 28, 2009, 19 pages.
U.S. Appl. No. 11/937,118, Final Office Action dated Dec. 3, 2010; 19 pages.
U.S. Appl. No. 11/937,118, Final Office Action dated Oct. 14, 2011; 20 pages.
U.S. Appl. No. 11/937,118, Non-Final Office Action dated Mar. 18, 2011; 22 pages.
U.S. Appl. No. 11/937,118, Non-Final Office Action dated May 28, 2010; 21 pages.
U.S. Appl. No. 11/937,118, Notice of Allowance dated Jun. 12, 2012; 13 pages.
U.S. Appl. No. 11/937,118, Notice of Allowance dated Oct. 5, 2012; 24 pages.
U.S. Appl. No. 11/937,011, Advisory Action mailed Sep. 10, 2010, 3 pages.
U.S. Appl. No. 11/937,011, Amendment and Response filed Feb. 27, 2012, 11 pages.
U.S. Appl. No. 11/937,011, Amendment and Response filed Mar. 29, 2010, 13 pages.
U.S. Appl. No. 11/937,011, Amendment and Response filed Mar. 29, 2011, 11 pages.
U.S. Appl. No. 11/937,011, Amendment and Response filed Aug. 23, 2011, 14 pages.
U.S. Appl. No. 11/937,011, Amendment and Response filed Aug. 24, 2010, 13 pages.
U.S. Appl. No. 11/937,011, Final Office Action mailed May 25, 2012, 23 pages.
U.S. Appl. No. 11/937,011, Final Office Action mailed Jun. 23, 2011, 22 pages.
U.S. Appl. No. 11/937,011, Final Office Action mailed Jun. 24, 2010, 22 pages.
U.S. Appl. No. 11/937,011, Non-Final Office Action mailed Nov. 25, 2011, 21 pages.
U.S. Appl. No. 11/937,011, Non-Final Office Action mailed Nov. 29, 2010, 19 pages.
U.S. Appl. No. 11/937,011, Non-Final Office Action mailed Dec. 30, 2009, 16 pages.
U.S. Appl. No. 11/937,118, Advisory Action mailed Feb. 15, 2011, 3 pages.
U.S. Appl. No. 11/937,118, Amendment and Response filed Feb. 2, 2011, 13 pages.
U.S. Appl. No. 11/937,118, Amendment and Response filed Feb. 13, 2012, 14 pages.
U.S. Appl. No. 11/937,118, Amendment and Response filed Jul. 18, 2011, 16 pages.
U.S. Appl. No. 11/937,118, Amendment and Response filed Sep. 28, 2010, 10 pages.
U.S. Appl. No. 12/246,509, Non-Final Office Action dated Mar. 17, 2011; 22 pages.
U.S. Appl. No. 12/246,509, Notice of Allowance dated Aug. 28, 2012; 24 pages.
U.S. Appl. No. 12/246,509, Notice of Allowance dated Sep. 9, 2011; 23 pages.
U.S. Appl. No. 12/246,509, Amendment and Response filed Jul. 7, 2011, 17 pages.
U.S. Appl. No. 12/603,308, Amendment and Response filed Feb. 9, 2012, 18 pages.
U.S. Appl. No. 12/603,308, Amendment and Response filed Aug. 15, 2012, 15 pages.
U.S. Appl. No. 12/603,308, Amendment and Response filed Oct. 20, 2014, 11 pages.
U.S. Appl. No. 12/603,308, Final Office Action mailed May 15, 2012, 18 pages.
U.S. Appl. No. 12/603,308, Non-Final Office Action mailed Jul. 18, 2014, 22 pages.
U.S. Appl. No. 12/603,308, Non-Final Office Action mailed Nov. 9, 2011, 16 pages.
U.S. Appl. No. 12/603,308, Notice of Allowance mailed Dec. 3, 2014, 16 pages.
U.S. Appl. No. 12/603,445, Amendment and Response filed Sep. 6, 2012, 9 pages.
U.S. Appl. No. 12/603,445, Non-Final Office Action mailed Jun. 6, 2012, 8 pages.
U.S. Appl. No. 12/603,445, Notice of Allowance mailed Sep. 20, 2012, 5 pages.
U.S. Appl. No. 12/603,445, Notice of Allowance mailed Dec. 12, 2012, 6 pages.
U.S. Appl. No. 12/694,062, Notice of Allowance mailed Jul. 27, 2012, 10 pages.
U.S. Appl. No. 13/189,566 to Nano et al., filed Jul. 25, 2011; 41 pages.
U.S. Appl. No. 13/189,566, Amendment and Response filed Mar. 13, 2014, 13 pages.
U.S. Appl. No. 13/189,566, Amendment and Response filed May 1, 2013, 18 pages.
U.S. Appl. No. 13/189,566, Amendment and Response filed Sep. 19, 2013, 22 pages.
U.S. Appl. No. 13/189,566, Final Office Action mailed May 22, 2014, 7 pages.
U.S. Appl. No. 13/189,566, Final Office Action mailed Jun. 20, 2013, 20 pages.
U.S. Appl. No. 13/189,566, Non-Final Office Action mailed Feb. 1, 2013, 18 pages.
U.S. Appl. No. 13/189,566, Non-Final Office Action mailed Dec. 13, 2013, 18 pages.
U.S. Appl. No. 13/298,159, Amendment and Response filed Jan. 23, 2014, 9 pages.
U.S. Appl. No. 13/298,159, Amendment and Response filed May 29, 2013, 10 pages.
U.S. Appl. No. 13/298,159, Amendment and Response filed Oct. 18, 2013, 10 pages.
U.S. Appl. No. 13/298,159, Final Office Action mailed Nov. 15, 2013, 10 pages.
U.S. Appl. No. 13/298,159, Non-Final Office Action mailed Jan. 29, 2013, 15 pages.
U.S. Appl. No. 13/298,159, Non-Final Office Action mailed Jul. 2, 2013, 11 pages.
U.S. Appl. No. 13/298,159, Notice of Allowance mailed Feb. 14, 2014, 9 pages.
U.S. Appl. No. 13/298,159, Notice of Allowance mailed Aug. 18, 2014, 11 pages.
U.S. Appl. No. 13/409,443, Amendment and Response filed Dec. 4, 2014, 16 pages.
U.S. Appl. No. 13/409,443, Final Office Action mailed Dec. 29, 2014, 29 pages.
U.S. Appl. No. 13/409,443, Non-Final Office Action mailed Sep. 4, 2014, 23 pages.
U.S. Appl. No. 13/409,495, Amendment and Response filed Apr. 21, 2014, 12 pages.
U.S. Appl. No. 13/409,495, Amendment and Response filed Sep. 8, 2014, 13 pages.
U.S. Appl. No. 13/409,495, Amendment and Response filed Dec. 23, 2014, 15 pages.

(56) References Cited

OTHER PUBLICATIONS

U.S. Appl. No. 13/409,495, Final Office Action mailed Jun. 6, 2014, 10 pages.

U.S. Appl. No. 13/409,495, Non-Final Office Action mailed Sep. 23, 2014, 9 pages.

U.S. Appl. No. 13/409,495, Non-Final Office Action mailed Dec. 20, 2013, 7 pages.

U.S. Appl. No. 13/409,495, Notice of Allowance mailed Jan. 20, 2015, 5 pages.

U.S. Appl. No. 13/438,836 to Akchurin et al., filed Apr. 3, 2012; 36 pages.

U.S. Appl. No. 13/438,836, Amendment and Response filed Jun. 12, 2014, 12 pages.

U.S. Appl. No. 13/438,836, Amendment and Response filed Oct. 27, 2014, 13 pages.

U.S. Appl. No. 13/438,836, Final Office Action mailed Jul. 25, 2014, 12 pages.

U.S. Appl. No. 13/438,836, Non-Final Office Action mailed Mar. 12, 2014, 11 pages.

U.S. Appl. No. 13/614,184, Amendment and Response filed Jan. 22, 2014, 1 page.

U.S. Appl. No. 13/614,184, Non-Final Office Action mailed Nov. 21, 2013, 8 pages.

U.S. Appl. No. 13/614,184, Notice of Allowance mailed Feb. 26, 2014, 9 pages.

*Using the Query Binder—SQL Server 2008 R2*; Explicit Server Development Model: retrieved from httD://msdn. microsoft.com/en-us/librarv/ ee391319(SQl.105lasDx; 2009; 5 pages.

Wei et al, "ReCEPtor: Sensing Complex Events in Data Streams for Service-Oriented Architectures", retrieved at <<http://www.hpl.hp.com/techreports/2007/HPL-2007-176.pdf>>, Nov. 2, 2007. pp. 22.

Witkowski, "Continuous Queries in Oracle", Proceedings of the 33rd International Conference on Very Large Data Bases, Sep. 23-28, 2007.

Wong, "The Emerging Trend: Smartphone Ad and In-App Ad," Retrieved on: Dec. 13, 2011, Available at: http://www.slideshare.net/Madhouse/the-emerging-trend-smartphone-ad-and-in-app-ad.

Wu et al, "High-Performance Complex Event Processing over Streams", retrieved at <<http://www.cs.umass.edu/~yanlei/publications/sase-sigmod2006.pdf>>, 2006. pp. 12.

*Yahoo! Living Ads: Where Motion and Emotion Meet*, Retrieved on: Dec. 13, 2011, Available at: http://advertising.yahoo.com/blogs/events-blog/yahoo-living-ads-where-motion-emotion-meet-024820497.html.

Yoneki, "Unified Semantics for Event Correlation Over Time and Space in Hybrid Network Environments", 2005.

Zimmer, "On the Semantics of Complex Events in Active Database Management Systems", In Proceedings of the 15th International Conference on Data Engineering, Mar. 23-26, 1999.

U.S. Appl. No. 13/298,159, Notice of Allowance mailed Mar. 11, 2015, 9 pages.

U.S. Appl. No. 12/603,308, Notice of Allowance mailed Apr. 2, 2015, 16 pages.

U.S. Appl. No. 12/603,308, Notice of Allowance mailed Jun. 2, 2015, 15 pages.

U.S. Appl. No. 13/409,443, Amendment and Response filed Jun. 29, 2015, 18 pages.

U.S. Appl. No. 13/438,836, Amendment and Response filed Aug. 10, 2015, 16 pages.

U.S. Appl. No. 13/298,159, Notice of Allowance mailed Sep. 25, 2015, 10 pages.

U.S. Appl. No. 13/409,443, Amendment and Response filed Feb. 25, 2016, 20 pgs.

U.S. Appl. No. 13/409,443, Office Action mailed Nov. 25, 2015, 32 pgs.

U.S. Appl. No. 13/438,836, Office Action mailed Feb. 11, 2016, 13 pgs.

U.S. Appl. No. 13/409,443, Final Office Action mailed Mar. 31, 2016, 34 pages.

* cited by examiner

EVENT PROCESSING WITH XML QUERY BASED ON REUSABLE XML QUERY TEMPLATE

CROSS-REFERENCE TO RELATED APPLICATIONS

This application is a continuation application of U.S. patent application Ser. No. 12/603,308 (now U.S. Pat. No. 9,158,816), entitled "EVENT PROCESSING WITH XML QUERY BASED ON REUSABLE XML QUERY TEMPLATE," filed on Oct. 21, 2009, the entire disclosure of which is hereby incorporated herein by reference.

BACKGROUND

The event-based computation paradigm has grown in importance for enterprises. For example, many business applications and system control applications can be developed based on event-based computation. Generally, event processing applications receive events, analyze the events, and output results (e.g., proposed actions) based on the analysis of the events.

Current event processing systems often use structured query language (SQL) queries to analyze events. Due to the fluid nature of event streams, the relational algebra underlying traditional SQL may not be well-suited for processing events at a high rate. Additionally, performing time-based calculations using the relational operators provided by SQL may be difficult. Further, the semantics of a SQL query may require recitation of specific data sources, rendering a particular SQL query that recites a particular data source unsuitable for use with a different data source.

SUMMARY

The present disclosure describes an event processing framework that utilizes queries based on reusable XML query templates. A single XML query template may be reused with respect to multiple event sources and sinks. For example, an XML query template may be instantiated and bound to a particular input adapter for a particular source and to a particular output adapter for a particular sink. To run the same query against another source and another sink, the XML query template may be re-instantiated and bound to another input adapter and another output adapter. Input adapters and output adapters for various sources and sinks may be user-defined to handle conversion to and from proprietary data formats associated with various sources and sinks.

An XML query template may include a directed graph of operators. The operators may be relational algebra operators, time-based operators, or any other type of operator.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a system is disclosed that includes an input adapter, a query engine, and an output adapter. The input adapter is configured to receive an event from a source and to generate an event object based on the event. The event object includes a payload, a validity start time, and a validity end time. The query engine is configured to execute a query with respect to the event object to produce a result object. The query is represented by an extensible markup language (XML) file that is based on a reusable XML query template. The XML query template is bindable to a plurality of input adapters and to a plurality of output adapters. Result objects are produced based on applying at least one operator of the query to an input of the event objects. The output adapter is configured to generate results based on the result objects and to transmit the results to a sink.

In another particular embodiment, a computer-readable medium is disclosed. The computer-readable medium includes instructions, that when executed by a computer, cause the computer to receive at least one event from a source at an event processing system. Each event is represented in a first data format that is native to the source. The computer-readable medium also includes instructions, that when executed by the computer, cause the computer to convert the at least one event from the first data format to at least one event object formatted in a second data format. Each event object includes a payload, a validity start time, and a validity end time. The computer-readable medium further includes instructions, that when executed by the computer, cause the computer to execute a query with respect to the at least one event object to produce a result object. The query is executed without storing the at least one event object and is represented by an XML file based on a reusable XML query template. The result object is based on an application of at least one operator of the query to the event object and is formatted in the second data format. The computer-readable medium includes instructions, that when executed by the computer, cause the computer to convert the result object from the second data format into a result formatted in a third data format that is native to a sink and to transmit the result to the sink.

Figure 1:
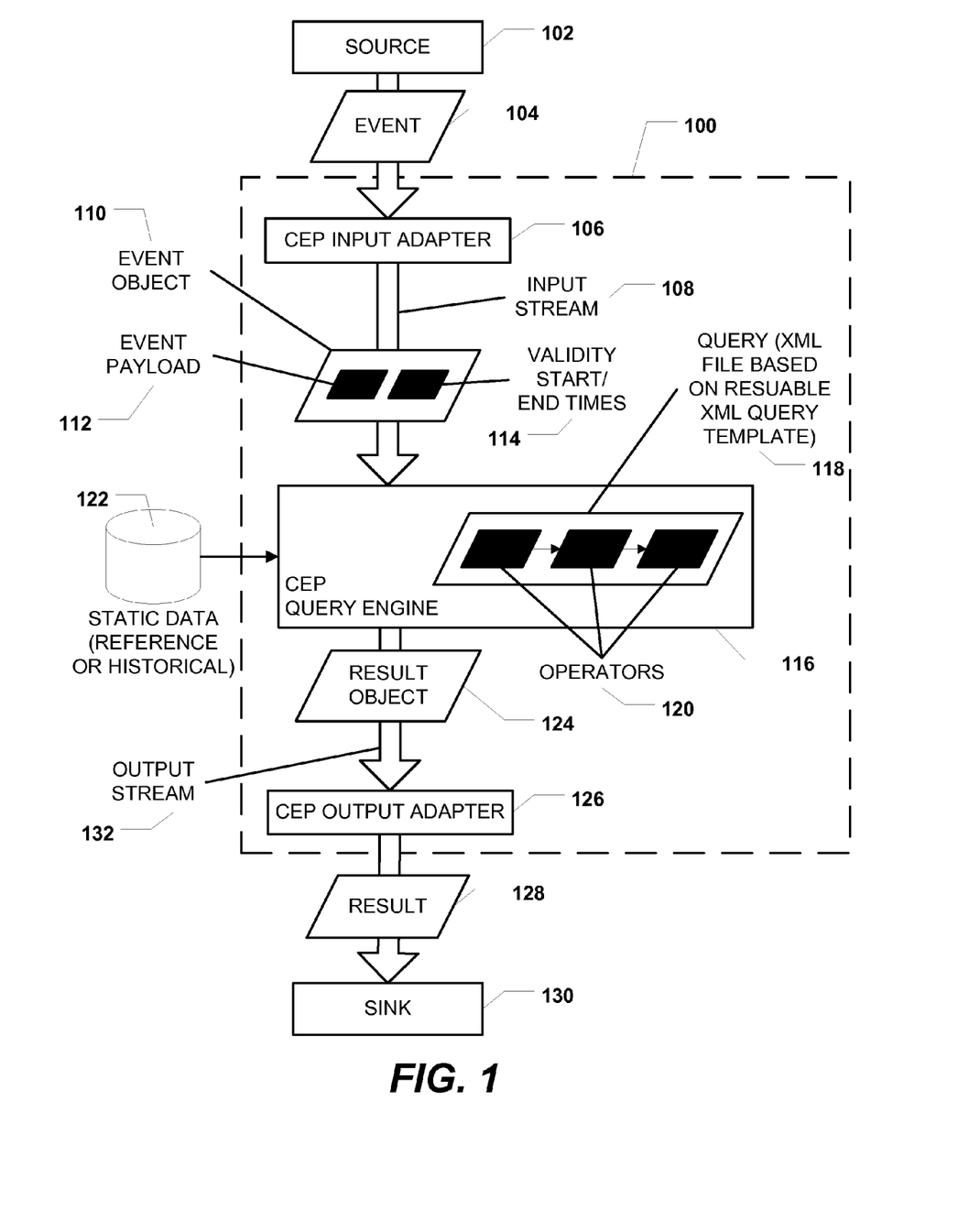
FIG. 1 is a block diagram to illustrate a particular embodiment of a system of event processing that uses a query based on a reusable XML query template.

FIG. 1 is a block diagram to illustrate a particular embodiment of an event processing system 100 that uses an XML query based on a reusable XML query template. The system 100 is configured to receive events (e.g., an illustrative event 104) from a source 102 via a complex event processing (CEP) input adapter 106 and to transmit results (e.g., an illustrative result 128) to a sink 130 via a CEP output adapter 126. The system 100 includes a CEP query engine 116 configured to execute an XML query 118 based on a reusable XML query template. The XML query template may be "reusable" and "bindable" because the XML query template may be instantiated as multiple queries, where each query is bound to a particular input adapter and a particular output adapter. For example, the XML query 118 may be bound to the CEP input adapter 106 and the CEP output adapter 126. In a particular embodiment, the system 100 is included in a complex event processing (CEP) system.

The CEP input adapter 106 at the system 100 is configured to receive events, such as the event 104 from the source 102. For example, the source 102 may include a database, a server, an event ticker, a network port, a sensor, or some other event source that provides events to the CEP input adapter 106 periodically, randomly, or intermittently in bursts. The CEP input adapter 106 is also configured to generate (e.g., via translation or conversion) event objects (e.g., the illustrative event object 110) based on the events and to transmit the generated event objects to the CEP query engine 116 via an input stream 108. In a particular embodiment, the events received from the source 102 are formatted in a first data format (e.g., a proprietary data format) that is native to the source, and the event objects are formatted in a second data format that is native to the system 100. In a particular embodiment, the second data format that is native to the system 100 specifies that each event object 110 includes an event payload 112, an event validity start time and an end time 114.

The CEP query engine 116 is configured to receive event objects via the input stream 108 and to execute a query 118 with respect to the event objects to produce result objects (e.g., an illustrative result object 124). The CEP query engine 116 is also configured to transmit the result object 124 to the CEP output adapter 126 via an output stream 132.

The query 118 may be represented by an XML file based on a reusable XML query template that is bindable to multiple input adapters and multiple output adapters. Thus, the query template may be reusable with multiple sources and multiple sinks, where usage of the query template with a particular source includes binding the query template to a particular input adapter for the particular source and usage of the query template with a particular sink includes binding the query template to a particular output adapter for the particular sink. An adapter may be user-defined and may be written in a .NET programming language against an adapter application programming interface (API). Query template bindings are further described with respect to FIG. 2. The query 118 may include a directed graph of one or more operators 120. Operators may include, but are not limited to, projection operators, windowing operators, aggregation operators, grouping operators, join operators, and selection operators. Operators may be payload specific, validity start time-specific, validity end-time specific, or some combination thereof. Specific operator types are further described with respect to FIG. 3. The result object 124 is produced based on an application of the operators 120 of the query 118 to the event object 110.

In a particular embodiment, executing the query 118 at the CEP query engine 116 includes comparing event objects to static reference data retrieved from a static data source 122. Event objects may also be compared to historical data (e.g., historical data of the source 102, historical data of the sink 130, historical data of the query 118, or some other historical data) from the static data source 122. In another particular embodiment, executing the query 118 at the CEP query engine 116 includes storing data to the static data source 122.

In a particular embodiment, the query 118 represents a declarative query. Generally, declarative programming languages indicate "what" is to be done (e.g., what particular inputs will be provided and what particular outputs will be generated) rather than "how" it is done (e.g., the underlying algebra functions and the programmatic steps to convert the inputs into the outputs). Thus, it may be easier for users to specify declarative queries as compared to non-declarative queries, because event-level implementation details of declarative queries may not influence the result of declarative queries. For example, a declarative query may be defined in a language integrated query (LINQ) language, a .NET programming language other than LINQ, or a complex event detection and response (CEDR) algebra. For example, an illustrative LINQ query may include:

```
// filter by the value of event field SourceId and transform
// the event in the project expression
var filter = from e in inputDataStream
    where e.SourceId == "s7"
    select new { e.SourceId, ConvertedVal = e.Value *100 };
```

An illustrative XML file representation of the above LINQ query may include:

```
<QueryTemplate
Name="cep:/Server/Application/ObjectModelSample/QueryTemplate/SampleQueryTemplate"
xmlns="http://schemas.microsoft.com/ComplexEventProcessing/2009/05/Metadata">
    <Import Name="DataInput"
Type="cep:/Server/Application/ObjectModelSample/EventType/SampleReading">
        <OutputStream Name="Import.3.0" />
    </Import>
    <Export Name="_outputStream_">
        <InputStream Name="Project.1.2" />
    </Export>
    <Project Name="Project.1.2">
        <InputStream Name="Select.2.1" />
        <OutputStream Name="Project.1.2" />
        <ProjectExpression OutputField="ConvertedVal">
            <Multiply>
                <InputField Name="Value" StreamName="Select.2.1" />
                <Constant
Type="cep:/Server/Application/system/EventType/System.Double"
Value="100" />
            </Multiply>
        </ProjectExpression>
        <ProjectExpression OutputField="SourceId">
            <InputField Name="SourceId" StreamName="Select.2.1" />
        </ProjectExpression>
    </Project>
    <Select Name="Select.2.1">
```

```
    <InputStream Name="Import.3.0" />
    <OutputStream Name="Select.2.1" />
    <FilterExpression>
        <Equal>
            <InputField Name="SourceId" StreamName="Import.3.0" />
            <Constant
Type="cep:/Server/Application/system/EventType/System.String"
Value="s7" />
        </Equal>
    </FilterExpression>
    </Select>
</QueryTemplate>
```

In a particular embodiment, executing the query 118 at the CEP query engine 116 includes parsing the XML file representing the query in accordance with one or more XML schema definition (XSD) files. For example, such XSD files useable to parse XML queries may be available from Microsoft Corp. at 1, Microsoft Way Redmond, Wash. 98052.

In a particular embodiment, the CEP query engine 116 is configured to provide "in-flight" processing of event objects. That is, the CEP query engine 116 may receive event objects, execute the query 118, and transmit produced result objects without storing the event objects or the result objects in a memory of the system 100. In a particular embodiment, support for in-flight processing enables the system 100 to process hundreds of thousands of event objects per second, or more.

The CEP output adapter 126 at the system 100 is configured to transmit results such as the result 128 to the sink 130. The CEP output adapter 126 is also configured to generate (e.g., via translation or conversion) the results based on result objects (e.g., the result object 124) received from the CEP query engine 116 via the output stream 132. In a particular embodiment, result objects received from the query engine are in the second data format native to the system 100 and the results are formatted in a third data format (e.g., another proprietary data format) that is native to the sink 130. The sink 130 may include a communications device, a mobile device, a computer system, a database, a server, an event store, or some other consumer of results produced by the system 100.

In a particular embodiment, the CEP input adapter 106 and the CEP output adapter 126 are coupled to network interfaces, such as a wired interface (e.g., Ethernet), a wireless interface (e.g., IEEE 802.11a/b/g/n), or some other network interface. In another particular embodiment, one or more of the source 102 and the sink 130 may be local to a computer system that includes the system 100 of FIG. 1.

In a particular embodiment of operation, the CEP input adapter 106 may receive the event 104 from the source 102 and generate an event object 110 based on the event 104. The event object includes an event payload 112 and validity start/end times 114. The CEP query engine 116 may execute the query 118 with respect to the event object 110 to generate the result object 124. The query may be represented by an XML file that is based on a reusable XML query template (e.g., generated based on a LINQ query). The CEP output adapter 126 may generate a result 128 based on the result object 124 and may transmit the result 128 to the sink 130

It will be appreciated that the system 100 of FIG. 1 may enable event processing using XML queries based on reusable XML query templates. Thus, the system 100 of FIG. 1 may enable a user to define a query without reciting specific sources or sinks and without depending on technology-specific operations associated with the specific sources or sinks. It will further be appreciated that the system 100 of FIG. 1 may provide such event processing functionality in various embodiments. For example, the system 100 of FIG. 1 may be integrated into an embedded dynamically linked library (DLL), an executable file, an operating system service, or a server farm.

Figure 2:
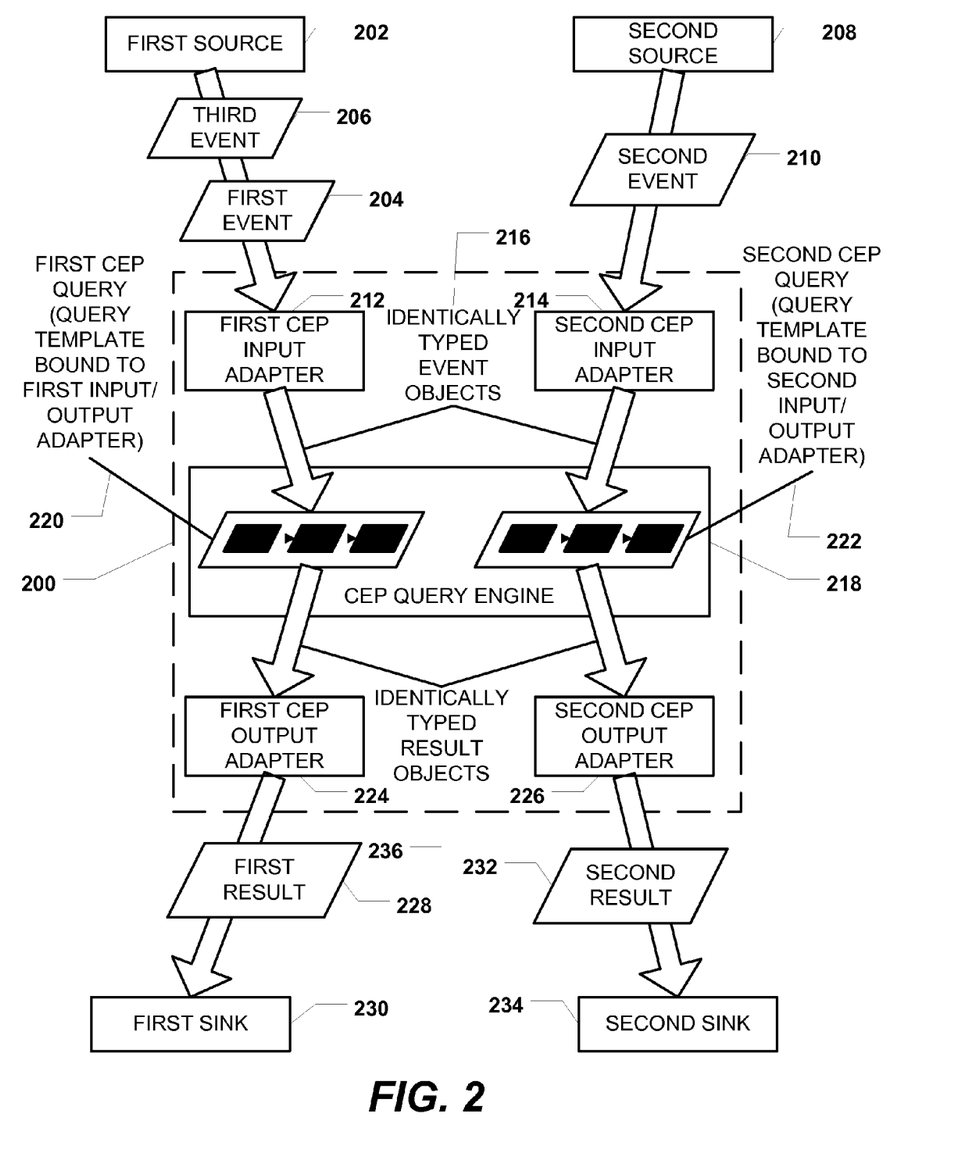
FIG. 2 is a block diagram to illustrate another particular embodiment of a system of event processing that uses a query based on a reusable XML query template.

FIG. 2 is a block diagram to illustrate another particular embodiment of an event processing system 200 that uses an XML query based on a reusable XML query template. The system 200 is configured to receive events (e.g., an illustrative first event 204 and a third event 206 transmitted subsequent to the first event 204) from a first source 202 and to receive events (e.g., an illustrative second event 210) from a second source 208. The system 200 is also configured to transmit results (e.g., an illustrative first result 228) to a first sink 230 and to transmit results (e.g., an illustrative second result 232) to a second sink 234. The system 200 includes a complex event processing (CEP) query engine configured to execute XML queries (e.g., illustrative CEP queries 220, 222) based on a reusable XML query template.

A first CEP input adapter 212 at the system 200 may receive events from the first source 202, produce event objects 216 based on the events, and transmit the event objects 216 to the CEP query engine 218 as described herein with reference to the CEP input adapter 106 of FIG. 1. Similarly, a second CEP input adapter 214 at the system 200 may receive events from the second source 208, produce event objects 216 based on the events, and transmit the event objects 216 to the CEP query engine 218 as described herein with reference to the CEP input adapter 106 of FIG. 1.

The CEP query engine 218 is configured to receive event objects 216 from the CEP input adapters and execute the CEP queries 220, 222 with respect to the event objects 216 to produce result objects 236. The CEP query engine 218 is also configured to transmit the result objects 236 to the CEP output adapters 224, 226. The CEP queries 220, 222 may be represented by XML files and may be based on the same XML query template. That is, the first CEP query 220 may be an instantiation of the XML query template bound to the first CEP input adapter 212 and the first CEP output adapter 224, and the second CEP query 222 may be an instantiation of the XML query template bound to the second CEP input adapter 214 and the second CEP output adapter 226.

It should be noted that CEP queries may not be limited to producing a single result object for each event object. Depending on the particular operator(s) in the query, any number of result objects may be produced from a single event object, and any number of event objects may be consumed in producing a single result object. For example, a result object may be produced by executing a query with respect to multiple events objects of a particular stream (e.g., a first event object based on the first event 204 and a second event object based on the third event 206).

In a particular embodiment, when the CEP queries 220, 222 are instantiations of the same XML query template, the event objects 216 produced by the CEP input adapters 212, 214 are identically typed. The result objects 236 transmitted to the CEP output adapters 224, 226 are also identically typed. For example, if a directed graph of operators in the XML query template accepts as input one integer value and two floating point values, each of the CEP input adapters 212, 214 produce event objects that include one integer value and two floating values as the event object payload. As another example, if the directed graph of operators in the XML query template produces as an output a single Boolean value, each of the CEP output adapters 224, 226 will accept result objects that include a single Boolean value as the result object payload. Thus, any user-defined input adapter (and by extension, event source) may be bound to an XML query template, provided that the user-defined input adapter produces event objects that fulfill data type expectations of the XML query template. Similarly, any user-defined output adapter (and by extension, result sink) may be bound to an XML query template, provided that the user-defined output adapter accepts result objects that include data types produced by the XML query template. It should be noted that although the particular embodiment illustrated in FIG. 2 depicts identically typed event objects, event objects from input adapters may be dissimilarly typed. For example, when a query template is bound to multiple input streams that are combined via query logic (e.g., a join operator), the event objects transmitted by the input adapters may not be identically typed.

An illustrative embodiment of an XML file that represents a bound query may include:

result objects 236, and transmit the results to the second sink 234 as described herein with reference to the CEP output adapter 126 of FIG. 1.

In a particular embodiment of operation, the first CEP input adapter 212 may generate event objects 216 based on events (e.g., the first event 204 and the third event 206) received from the first source 202, and the second CEP input adapter 214 may generate event objects 216 based on events (e.g., the second event 210) received from the second source 208. The event objects 216 are identically typed. The CEP query engine may execute a first CEP query 220 bound to the first CEP input adapter 212 and to the first CEP output adapter 224 to generate result objects 236 that are transmitted to the first CEP output adapter 224. The CEP query engine may also execute a second CEP query 222 bound to the second CEP input adapter 214 and to the first CEP output adapter 226 to generate result objects 236 that are transmitted to the second CEP output adapter 226. The result objects 236 may be identically typed. The first CEP output adapter 224 may transmit results (e.g., the first result 228) to the first sink 230 and the second CEP output adapter 226 may transmit results (e.g., the second result 232) to the second sink 234

In a particular embodiment, the first CEP query 220 and the second CEP query 222 execute simultaneously. In another particular embodiment, the first CEP query 220 executes during a first time period and the second CEP query 222 executes during a second time period (e.g., subsequent to the first time period).

```xml
<?xml version="1.0" encoding="utf-8" ?>
<Query
    xmlns="http://schemas.microsoft.com/ComplexEventProcessing/2009/
    10/Metadata"
    Name="cep:/Server/Application/appl/Query/AdvanceTameEdge"
    QueryTemplate="cep:/Server/Application/appl/QueryTemplate/AdvanceTimeQueryTemplate"
    Description="">
<OutputStreamBinding OutputStream ="OutputStream"
    OutputStreamTarget="cep:/Server/Application/appl/OutputAdapter/MultiShapeOutputAdapter"
    StreamEventOrdering="ChainOrdered"
    EventShape="Edge">
    <AdapterConfiguration>
        <MyOutputAdapterConfig>
            <FileName>AdvanceTimeEdgeOutput.txt</FileName>
            <EventCount>39</EventCount>
            <SignalEventName>AdvanceTimeEdgeComplete</SignalEventName>
        </MyOutputAdapterConfig>
    </AdapterConfiguration>
</OutputStreamBinding>
<InputStreamBinding InputStream="InputStream"
    InputStreamSource="cep:/Server/Application/appl/InputAdapter/MultiShapeInputAdapter"
    EventShape="Edge">
    <AdvanceTime Policy="Adjust">
        <EventCountFrequency Value="1" />
        <DurationSlack Value="PT0.000S" />
    </AdvanceTime>
    <AdapterConfiguration>
        <MyInputAdapterConfig>
            <FileName>AdvanceTimeEdgeInput.txt</FileName>
        </MyInputAdapterConfig>
    </AdapterConfiguration>
</InputStreamBinding>
</Query>
```

The first CEP output adapter 224 at the system 200 may receive result objects 236 from the query engine 218, produce results (e.g., the first result 228) based on the result objects 236, and transmit the results to the first sink 230 as described herein with reference to the CEP output adapter 126 of FIG. 1. Similarly, the second CEP output adapter 226 at the system 200 may receive result objects 236 from the query engine 218, produce results (e.g., the second result 232) based on the It will be appreciated that the system 200 of FIG. 2 may enable the instantiation of multiple queries based on the same query template. It will further be appreciated that the instantiations (and the input/output adapters bound to the instantiations) may execute simultaneously or successively.

Figure 3:
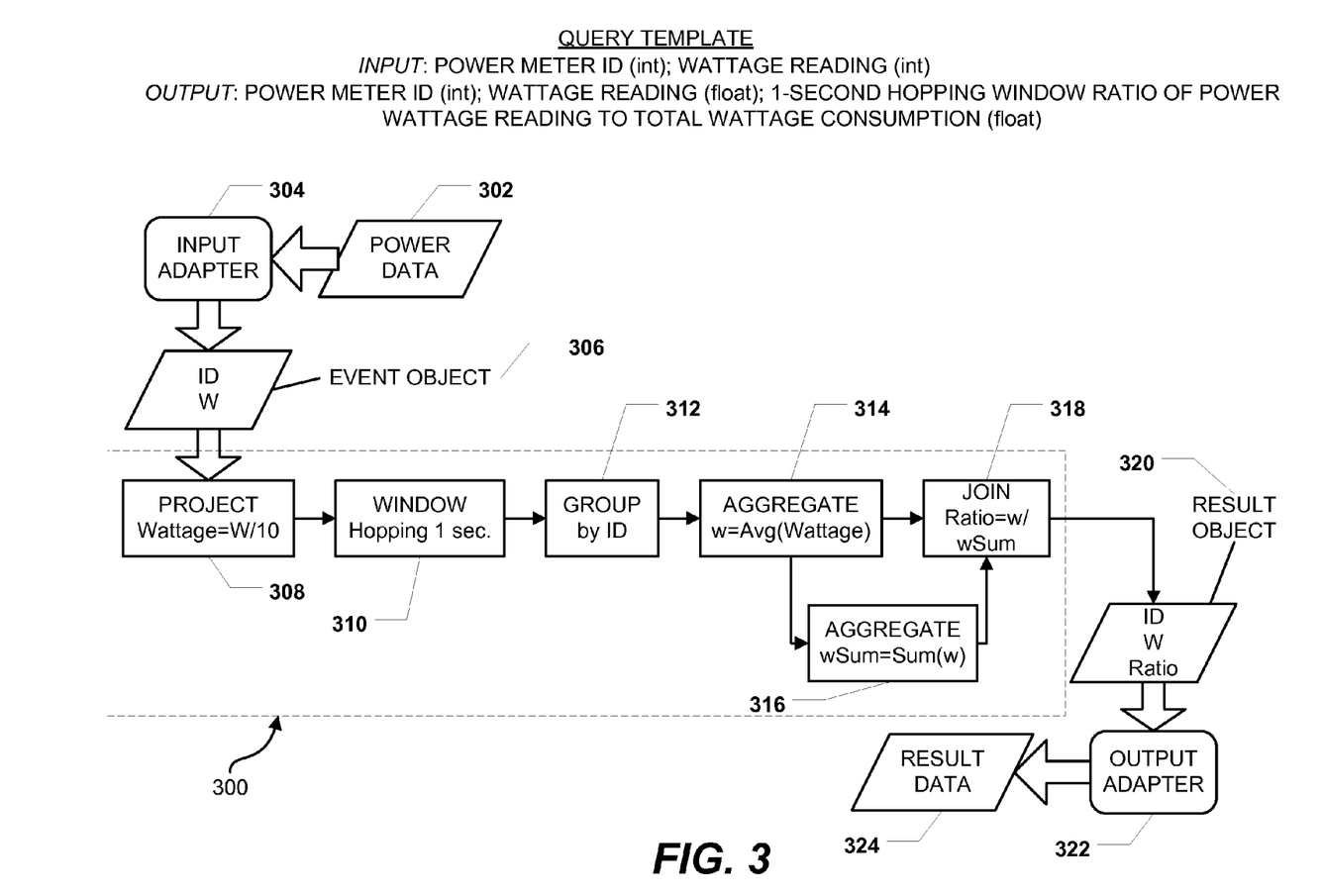
FIG. 3 is a diagram depicting an illustrative query template that may be used with the system of FIG. 1 or the system of FIG. 2.

FIG. 3 is a diagram depicting an illustrative query template 300 that may be used with the system of FIG. 1 or the system of FIG. 2. For example, the query template 300 may be the basis for the query 118 of FIG. 1 or the CEP queries 220, 222 of FIG. 2.

A query template may be viewed as a computational assembly line, where the input of the assembly line is attached to an input adapter and the output of the assembly line is attached to an output adapter. To illustrate the use of the query template 300, consider a plurality of power meters configured to measure power consumption (in watts) by a particular machine component. Each of the power meters may function as an event source for an event processing system and my transmit power data 302 to the event processing system in the form of events, where events from a particular power meter include wattage readings from the particular power meter. The power meters may produce multiple event objects per second.

An input adapter 304 of the event processing system may generate event objects (e.g., the illustrative event object 306) based on the power data 302. Each such event object may include as payload an integer power meter identifier (ID) and an integer wattage reading (W, a fixed point reading measured in tenths of Watts), where the ID identifies the particular power meter that produced the wattage reading W. Each such event object includes a validity start time and a validity end time (not shown).

The event objects generated by the input adapter 304 may be transmitted to a query execution engine that is configured to execute a query based on the query template 300. That is, the query execution engine may be configured to execute an instantiation of the query template that is bound to the input adapter 304 and to an output adapter 322. The query template 300 may include a directed graph of operators. For example, in the particular embodiment illustrated in FIG. 3, the operators include a projection operator 308, a hopping window operator 310, a grouping operator 312, a first aggregation operator 314, a second aggregation operator 316, and a join operator 318. In general, the query template 300 may be configured to perform the following calculation logic: "First, divide every received wattage value by 10 to convert the fixed point reading to Watts. Then apply a hopping window of one second to the objects. Next, group the objects by power meter ID and average the wattage readings separately for each group (i.e., average each power meter separately). Calculate the total sum of all such average values over all meters and use that calculated total sum to compute a ratio of wattage consumption reported by a particular power meter to overall wattage consumption (i.e., how much power each machine component associated with each power meter contributes to the overall consumption of the machine)."

In accordance with the above logic, during operation of the event processing system, the projection operator 308 may generate an intermediate value "Wattage=W/10." Next, the hopping window operator 310 may apply a one second window to the calculation (e.g., collect event objects with validity start times within the last second). The grouping operator 312 may then partition the collection of event objects by power meter ID, and the aggregation operator 314 may compute a value "w" for each power meter, where "w" for a particular power meter represents the average power consumption of the particular power meter over the previous one second. The second aggregation operator 316 may compute a value "wSum" that represents a sum of the "w" value for all power meters. Finally, a join operator 318 may compute a value "Ratio=w/wSum" representing the ratio of power consumption reported by the power meter associated with the event object 306 to total power consumption of all power meters.

The query template 300 may produce result objects (e.g., the illustrative result object 320) having as payload an integer power meter identifier (ID), a floating point wattage reading (W), and a floating point power consumption ratio (Ratio). The result objects may be transmitted by the query execution engine to an output adapter 322, and the output adapter may transmit result data 324 to a client of the event processing system. For example, the client may be a power throttling computer configured to selectively down-throttle power provided to a particular machine component in response to receiving result data 324 indicating that the particular machine component is consuming over 50% of total power.

Figure 4:
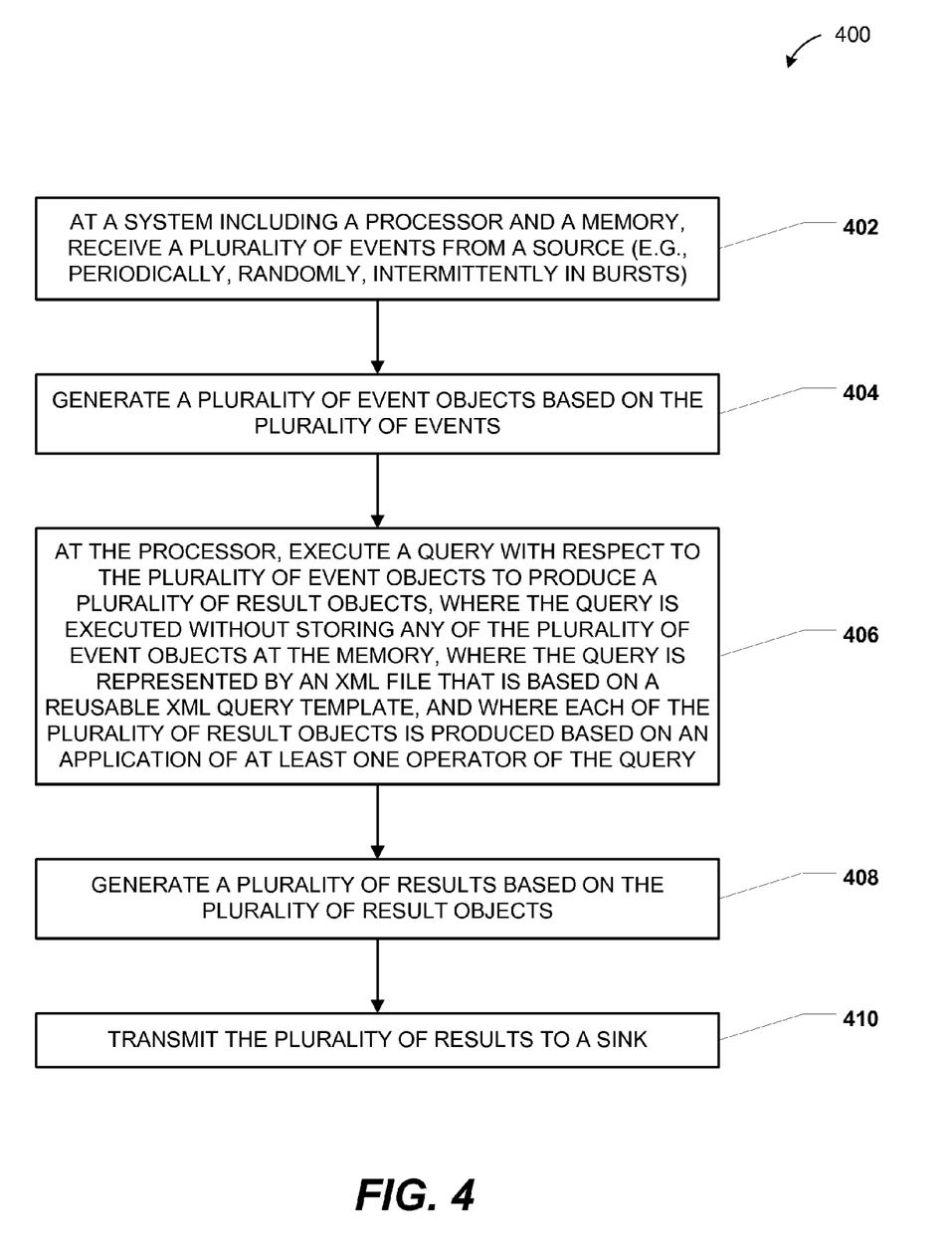
FIG. 4 is a flow diagram to illustrate a particular embodiment of a method of event processing that uses a query based on a reusable XML query template.

FIG. 4 is a flow diagram to illustrate a particular embodiment of a method 400 of event processing with a query based on a reusable XML query template. In an illustrative embodiment, the method 400 may performed by the system 100 of FIG. 1 or the system 200 of FIG. 2.

The method 400 includes, at a system including a processor and a memory, receiving a plurality of events from a source, at 402. For example, the plurality of events may be received periodically, randomly, intermittently in bursts, or in some other fashion. For example, in FIG. 1, the system 100 may receive a plurality of events including event 104 from the source 102.

The method 400 also includes generating a plurality of event objects based on the plurality of events, at 404. For example, in FIG. 1, the CEP input adapter 106 may generate a plurality of event objects including illustrative event object 110 based on the plurality of events.

The method 400 further includes, at the processor, executing a query with respect to the plurality of event objects to produce a plurality of result objects, at 406. The query is executed without storing any of the plurality of event objects at the memory and the query is represented by an XML file that is based on a reusable XML query template. Each of the plurality of result objects is based on an application of at least one operator of the query. For example, in FIG. 1, the CEP query engine 116 may execute the query 118 with respect to the plurality of event objects to produce a plurality of result objects, where the query 118 is represented by an XML file based on a reusable XML query template. The result object 124 may be produced by executing the query 118 with respect to the event object 110, including applying the operators 120 of the query 118 to the event object 110.

The method 400 includes generating a plurality of results based on the plurality of result objects, at 408. For example, in FIG. 1, the CEP output adapter 126 may generate a plurality of results including illustrative result 128 based on the plurality of result objects. The method 400 also includes transmitting the plurality of results to a sink, at 410. For example, in FIG. 1, the plurality of results may be transmitted to the sink 130.

Figure 5:
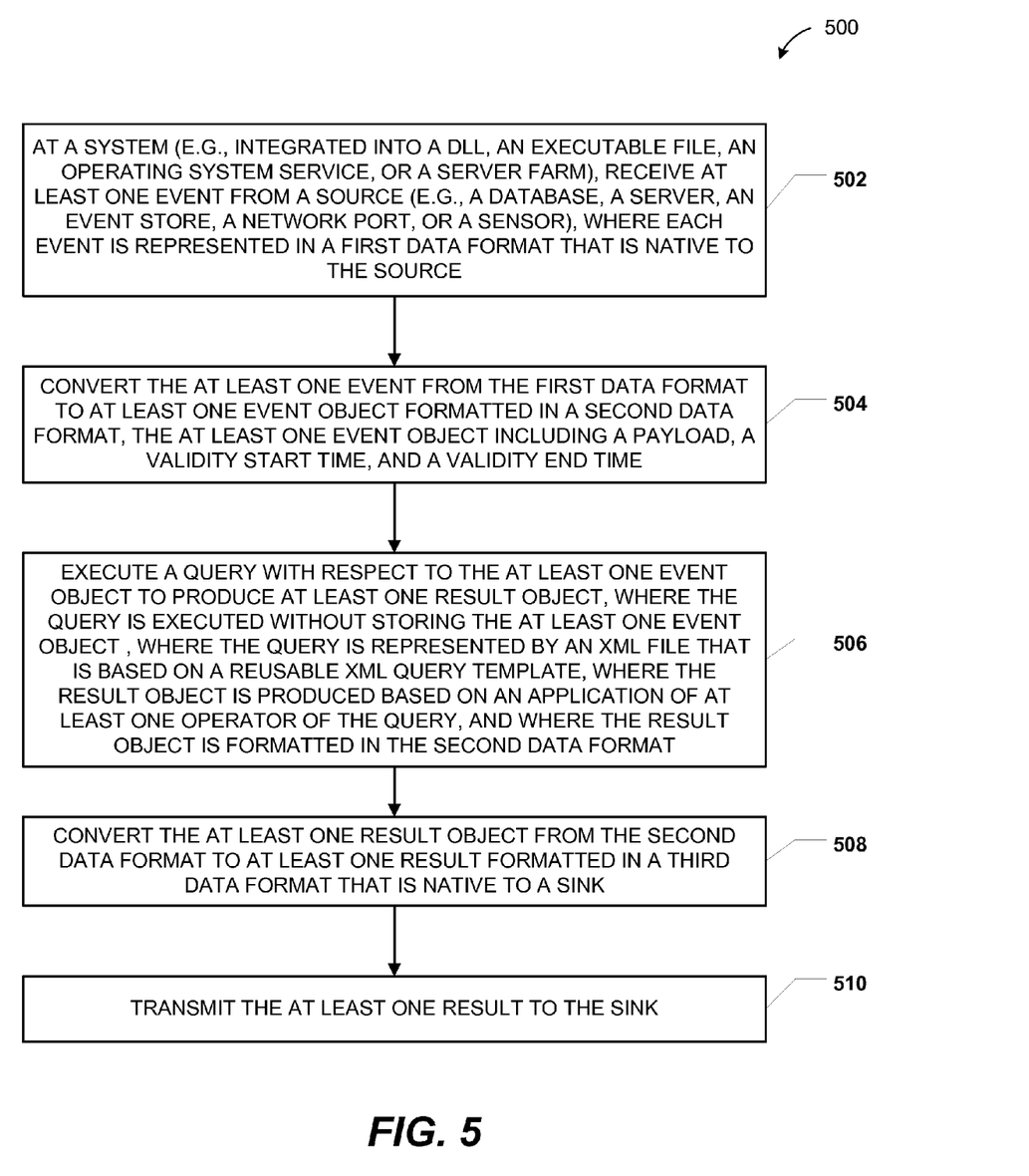
FIG. 5 is a flow diagram to further illustrate event processing that uses a query based on a reusable XML query template in accordance with the method of FIG. 4.

FIG. 5 is a flow diagram to further illustrate event processing using a query based on a reusable XML query template in accordance with the method 400 of FIG. 4. In an illustrative embodiment, the method 500 of FIG. 5 may be performed by the system 100 of FIG. 1 or the system 200 of FIG. 2.

The method 500 includes, at a system, receiving at least one event from a source, where the event is represented in a first data format that is native to the source, at 502. For example, in FIG. 1, the CEP input adapter 106 may receive the event 104 from the source 102, where the event 104 is represented in a first data format that is native to the source 102.

The method 500 also includes converting the at least one event from the first data format to at least one event object formatted in a second data format, at 504. The at least one event object includes a payload, a validity start time, and a validity end time. For example, in FIG. 1, the CEP input adapter 106 may convert the event 104 to the event object 110, where the event object 110 is formatted in a second data format and includes the event payload 112 and the event validity start/end times 114.

The method 500 further includes executing a query with respect to the at least one event object to produce a result object, at 506. The query is executed without storing the at least one event object, and the query is represented by an XML file that is based on a reusable XML query template. The result object is produced based on an application of at least one operator of the query and is formatted in the second data format. For example, in FIG. 1, the CEP query engine 116 may execute the query 118 with respect to the event object 110 to produce the result object 124 without storing the event object 110, where the query is represented by an XML file based on a reusable XML query template and where the result object 124 is produced based on application of the operators 120 to the event object 110. The result object 124 may be formatted in the second data format.

The method 500 includes converting the at least one result object from the second data format to at least one result formatted in a third data format that is native to a sink, at 508. For example, in FIG. 1, the CEP output adapter 126 may convert the result object 124 to the result 128, where the result 128 is formatted in a third data format that is native to the sink 130. The method 500 includes transmitting the at least one result to the sink, at 510. For example, in FIG. 1, the CEP output adapter 126 may transmit the result 128 to the sink 130.

It will be appreciated that with a reusable query template, the method 500 of FIG. 5 may enable users to reuse the XML query template with a new source or a new sink by simply encapsulating the conversion logic to translate to and from the data of the new source or the new sink into a new input adapter or a new output adapter.

Figure 6:
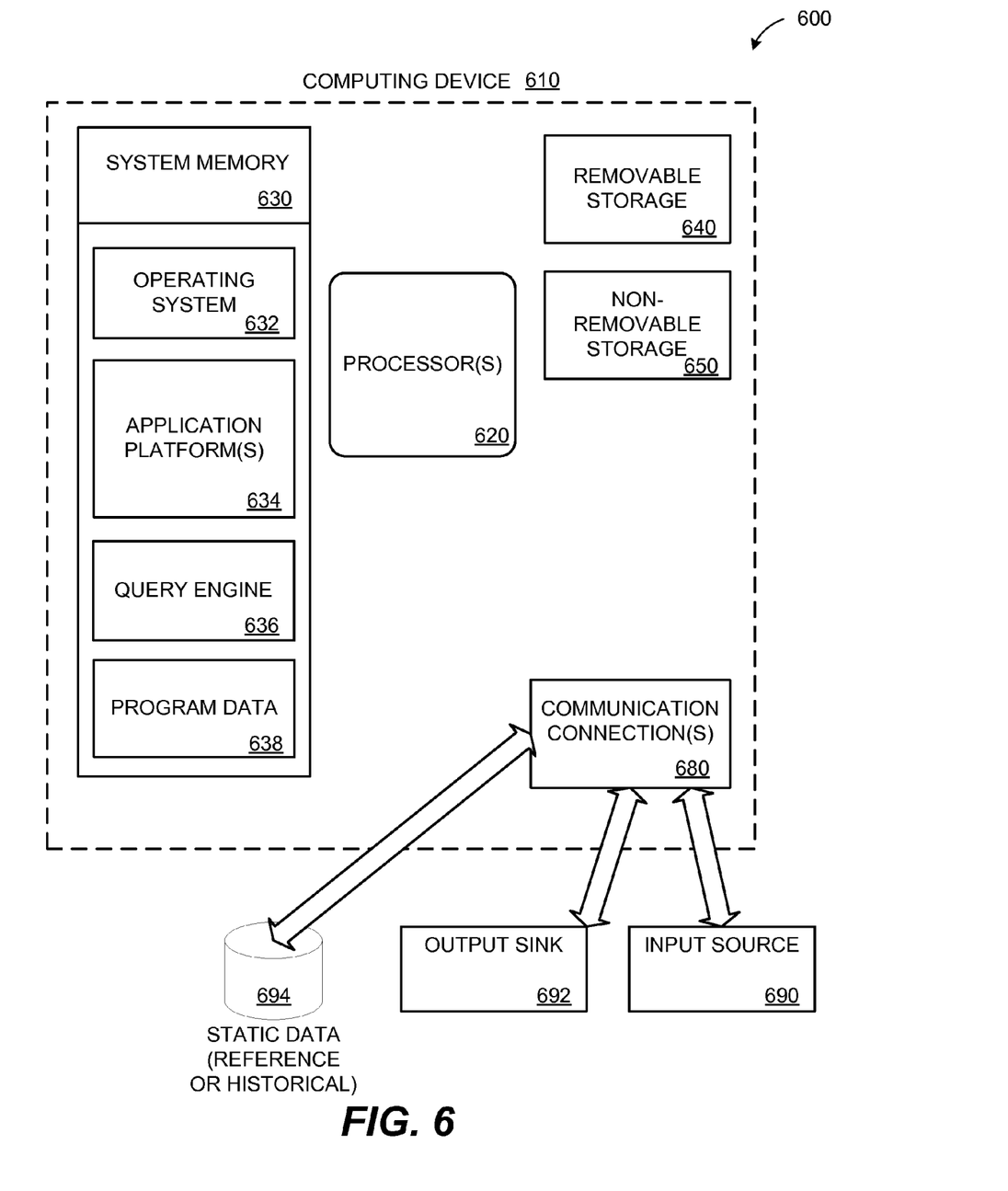
FIG. 6 is a block diagram of a computing environment including a computing device operable to support embodiments of computer-implemented methods, computer program products, and system components as illustrated in FIGS. 1-5.

FIG. 6 depicts a block diagram of a computing environment 600 including a computing device 610 operable to support embodiments of computer-implemented methods, computer program products, and system components according to the present disclosure. In an illustrative embodiment, the computing device 610 may include one or more of the CEP input adapter 106 of FIG. 1, the CEP output adapter 126 of FIG. 1, the CEP input adapters 212, 214 of FIG. 2, the CEP output adapters 224, 226 of FIG. 2, the CEP query engine 116 of FIG. 1, and the CEP query engine 218 of FIG. 2. Each of the CEP input adapter 106 of FIG. 1, the CEP output adapter 126 of FIG. 1, the CEP input adapters 212, 214 of FIG. 2, the CEP output adapters 224, 226 of FIG. 2, the CEP query engine 116 of FIG. 1, and the CEP query engine 218 of FIG. 2 may include or be implemented using the computing device 610 or a portion thereof.

The computing device 610 includes at least one processor 620 and a system memory 630. Depending on the configuration and type of computing device, the system memory 630 may be volatile (such as random access memory or "RAM"), non-volatile (such as read-only memory or "ROM," flash memory, and similar memory devices that maintain stored data even when power is not provided), or some combination of the two. The system memory 630 typically includes an operating system 632, one or more application platforms 634, one or more applications (e.g., a query engine 636), and may include program data 638 associated with the one or more applications. In an illustrative embodiment, the query engine 636 is the CEP query engine 116 of FIG. 1 or the CEP query engine 218 of FIG. 2.

The computing device 610 may also have additional features or functionality. For example, the computing device 610 may also include removable and/or non-removable additional data storage devices such as magnetic disks, optical disks, tape, and standard-sized or miniature flash memory cards. Such additional storage is illustrated in FIG. 6 by removable storage 640 and non-removable storage 650. Computer storage media may include volatile and/or non-volatile storage and removable and/or non-removable media implemented in any method or technology for storage of information such as computer-readable instructions, data structures, program components or other data. The system memory 630, the removable storage 640 and the non-removable storage 650 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 610. Any such computer storage media may be part of the computing device 610.

The computing device 610 also contains one or more communication connections 680 that allow the computing device 610 to communicate with other computing devices (e.g., an input source 690, an output sink 692, and a static data source 694) over a wired or a wireless network. In an illustrative embodiment, the communication connections 680 include the adapters 106, 126 of FIG. 1 or the adapters 212, 214, 224, 226 of FIG. 2. In another illustrative embodiment, the source 690 is the source 102 of FIG. 1, the first source 202 of FIG. 2, or the second source 208 of FIG. 2. In another illustrative embodiment, the sink 692 is the sink 130 of FIG. 1, the first sink 230 of FIG. 2, or the second sink 234 of FIG. 2. In another illustrative embodiment, the static data source 694 is the static data source 122 of FIG. 1.

It will be appreciated that not all of the components or devices illustrated in FIG. 6 or otherwise described in the previous paragraphs are necessary to support embodiments as herein described. For example, the removable storage 640 and non-removable storage 650 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process or instruction steps described in connection with the embodiments disclosed herein may be implemented as electronic hardware, computer software, or combinations of both. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A system comprising:
a memory; and
a processor connected with the memory, the processor executing as a query engine configured to execute queries with respect to event objects to produce result objects, wherein a query is represented by an extensible markup language (XML) file that is based on a reusable XML query template that is bindable to a plurality of input adapters and a plurality of output adapters, the processor executing:
binding the reusable XML query template to a first input adapter for a source to input data for execution of the query to produce a first result for the query,
binding the reusable XML query template to a second input adapter, different from the first input adapter, for another source to input data for execution of the query to produce a second result for the query, and
executing processing of the query.

2. The system according to claim 1, wherein the processor further executing outputting of the first result.

3. The system according to claim 2, wherein at least one of the first input adapter, the second input adapter, the query engine, the first output adapter, and the second output adapter are integrated into a complex event processing (CEP) system.

4. The system according to claim 2, wherein the input adapter generates event objects that match an input type specification of the reusable XML query template and wherein the first output adapter accepts result objects that match an output type specification of the reusable XML query template.

5. The system according to claim 1, wherein the processor further executing outputting of the second result.

6. The system according to claim 1, wherein the binding to the first input adapter further comprises binding the reusable XML query template to a first output adapter for a sink to output the first result of the query, and the binding to the second input adapter further comprises binding the reusable XML query template to a second output adapter, different from the first output adapter, for another sink to output the second result.

7. The system according to claim 6, wherein the first input adapter transmits an event object to the query engine via an input stream and the first output adapter receives a result object from the query engine via an output stream.

8. The system according to claim 1, wherein both the first input adapter and the second input adapter are used to produce identically typed event objects in accordance with a type specification of the reusable XML query template.

9. The system according to claim 1, wherein the XML file includes a directed graph of the at least one operator.

10. The system according to claim 9, wherein the directed graph includes a projection operator, a windowing operator, an aggregation operator, a grouping operator, a join operator, a selection operator, or any combination thereof.

11. The system according to claim 1, wherein the XML file representing the query is generated based on a language integrated query (LINQ) language, a query in a .NET programming language other than LINQ, a complex event detection and response (CEDR) algebra query, or any combination thereof.

12. The system according to claim 1, wherein the system is integrated into an embedded dynamically linked library (DLL), an executable file, an operating system service, or a server farm.

13. The system according to claim 1, wherein at least one of the first input adapter, the second input adapter and the query engine are integrated into a complex event processing (CEP) system.

14. A system comprising:
a memory; and
a processor connected with the memory, the processor executing as a query engine configured to execute queries with respect to event objects to produce result objects, wherein a query is represented by an extensible markup language (XML) file that is based on a reusable XML query template that is bindable to a plurality of input adapters and a plurality of output adapters, the processor executing:
binding the reusable XML query template to a first output adapter for a sink to output first results from execution of the query,
binding the reusable XML query template to a second output adapter, different from the first output adapter, for another sink to output second results from execution of query, and
executing the query to generate the first results and the second results.

15. The system according to claim 14, wherein the processor further executing binding the reusable XML query template to a first input adapter for a source to input data for execution of the query.

16. The system according to claim 14, wherein the processor further executing binding the reusable XML query template to a second input adapter, different from the first input adapter, for another source to input data for execution of the query.

17. The system according to claim 14, wherein the processor further executing outputting of at least one of the first results and the second results.

18. The system according to claim 14, wherein both the first input adapter and the second input adapter are used to produce identically typed event objects in accordance with a type specification of the reusable XML query template.

19. The system according to claim 14, wherein the reusable XML query template is integrated into a complex event processing (CEP) system.

20. A computer-implemented method comprising:

binding a reusable XML query template to a first input adapter for a source and a first output adapter for a sink to produce a first result for a query;

binding the reusable XML query template to a second input adapter for another source and a second output adapter for another sink to produce a second result for the query; and executing, using a query engine operating on a processing device, the query to produce the first result and the second result, wherein the query engine is configured to execute queries with respect to event objects to produce result objects, and wherein a query is represented by an extensible markup language (XML) file that is based on the reusable XML query template that is bindable to a plurality of input adapters and a plurality of output adapters.

* * * * *